United States Patent
Karimian-Kakolaki et al.

(10) Patent No.: US 10,324,732 B2
(45) Date of Patent: Jun. 18, 2019

(54) MULTI-PURPOSE POWER CONTROLLER AND METHOD

(71) Applicant: ATI Technologies ULC, Markham (CA)

(72) Inventors: Behrooz Karimian-Kakolaki, Toronto (CA); Darlington C. Opara, Richmond Hill (CA)

(73) Assignee: ATI TECHNOLOGIES ULC., Markham, Ontario (CA)

( * ) Notice: Subject to any disclaimer, the term of this patent is extended or adjusted under 35 U.S.C. 154(b) by 0 days.

(21) Appl. No.: 15/096,778

(22) Filed: Apr. 12, 2016

(65) Prior Publication Data

US 2016/0232012 A1    Aug. 11, 2016

Related U.S. Application Data

(62) Division of application No. 13/611,771, filed on Sep. 12, 2012, now Pat. No. 9,310,863.

(51) Int. Cl.
*G06F 1/26* (2006.01)
*G06F 9/4401* (2018.01)

(52) U.S. Cl.
CPC .............. *G06F 9/4418* (2013.01); *G06F 1/26* (2013.01)

(58) Field of Classification Search
CPC .................................................. G06F 9/4401
See application file for complete search history.

(56) References Cited

U.S. PATENT DOCUMENTS

| 5,685,006 A | 11/1997 | Shiraishi |
| 7,937,683 B1 | 5/2011 | Herbst |
| 2009/0070447 A1 | 3/2009 | Jubinville et al. |
| 2011/0022859 A1* | 1/2011 | More .................... G06F 1/3203 713/300 |
| 2014/0075171 A1 | 3/2014 | Karimian-Kakolaki et al. |

* cited by examiner

*Primary Examiner* — Kim Huynh
*Assistant Examiner* — Eric Chang
(74) *Attorney, Agent, or Firm* — Volpe and Koenig, P.C.

(57) ABSTRACT

Described is a multi-purpose power controller and application specific standard product (ASSP) with improved block unification, reduced size and power, boot strapping, and power management. A multi-purpose field programmable non-volatile system power controller and ASSP initializing block may be embedded in a processor, such as a central processing unit (CPU), graphics processing unit (GPU), accelerated processing unit (APU), or other chipset. This controller and initializing block may be a configurable, while maintaining specialization, hardware block. This block may be implemented as a complex programmable logic device or as a simple cascaded programmable logic array block, such as being the equivalent of a few hundred logic gates, for example. Described also is a method of performing power sequencing and boot strapping for internal and external blocks on a chipset. The method includes powering a system power controller and initializing block and saving a power-up sequencing in a nonvolatile wake-up table.

13 Claims, 3 Drawing Sheets

MULTI-PURPOSE POWER CONTROLLER AND METHOD

CROSS REFERENCE TO RELATED APPLICATION

This application is a divisional of U.S. patent application Ser. No. 13/611,771, filed Sep. 12, 2012, which is incorporated by reference as if fully set forth.

FIELD OF THE INVENTION

The present invention is generally directed to power controllers and initializing blocks, and in particular, to a multi-purpose field programmable non-volatile system power controller.

BACKGROUND

Power control algorithms (PCAs) and/or finite state machines (FSMs) on computing platforms vary by product line and system vendor. PCAs and FSMs can be divided into different blocks for different integrated circuits (ICs) and generally are not centralized.

Application specific standard product (ASSP) data initialization and boot strapping are done in a static fashion using passive components and complex programmable logic devices (CPLDs) without an integrated versatile design. Because application specific integrated circuits (ASIC) have a hardcoded design, a challenge is created to satisfy the dynamic requirements of system developers.

Attempts to improve in this area include field programmable gate arrays (FPGAs) in a package with ICs that include the ability to be reconfigured. These FPGAs lack the ability for boot strapping and power management There is a need to improve the block unification, size and power reduction, boot strapping, and power management of a multi-purpose power controller and ASSP.

SUMMARY OF EMBODIMENTS

The present invention provides a multi-purpose power controller and logic (e.g., an ASSP) with improved block unification, reduced size and power, boot strapping, and power management. A multi-purpose field programmable non-volatile system power controller and ASSP initializing block may be embedded in a processor, such as a central processing unit (CPU), graphics processing unit (GPU), accelerated processing unit (APU), or other chipset. This controller and initializing block may be a configurable hardware block, while maintaining specialization. This block may be implemented as a complex mid-size complex programmable logic devices (CPLDs) or as cascaded programmable logic array (PLA) blocks, such as being the equivalent of a few hundred logic gates, for example.

BRIEF DESCRIPTION OF THE DRAWINGS

A more detailed understanding may be had from the following description, given by way of example in conjunction with the accompanying drawings, wherein.

DETAILED DESCRIPTION

The present invention provides a multi-purpose power controller and logic (e.g., an ASSP) with improved block unification, reduced size and power, boot strapping, and power management. A multi-purpose field programmable non-volatile system power controller and ASSP initializing block may be embedded in a processor, such as a CPU, GPU, APU, or other chip set. This controller and initializing block may be a configurable hardware block, while maintaining specialization. This block may be implemented as a complex mid-size CPLD or as cascaded programmable logic array (PLA) blocks, such as being the equivalent of a few hundred logic gates, for example.

Figure 1:
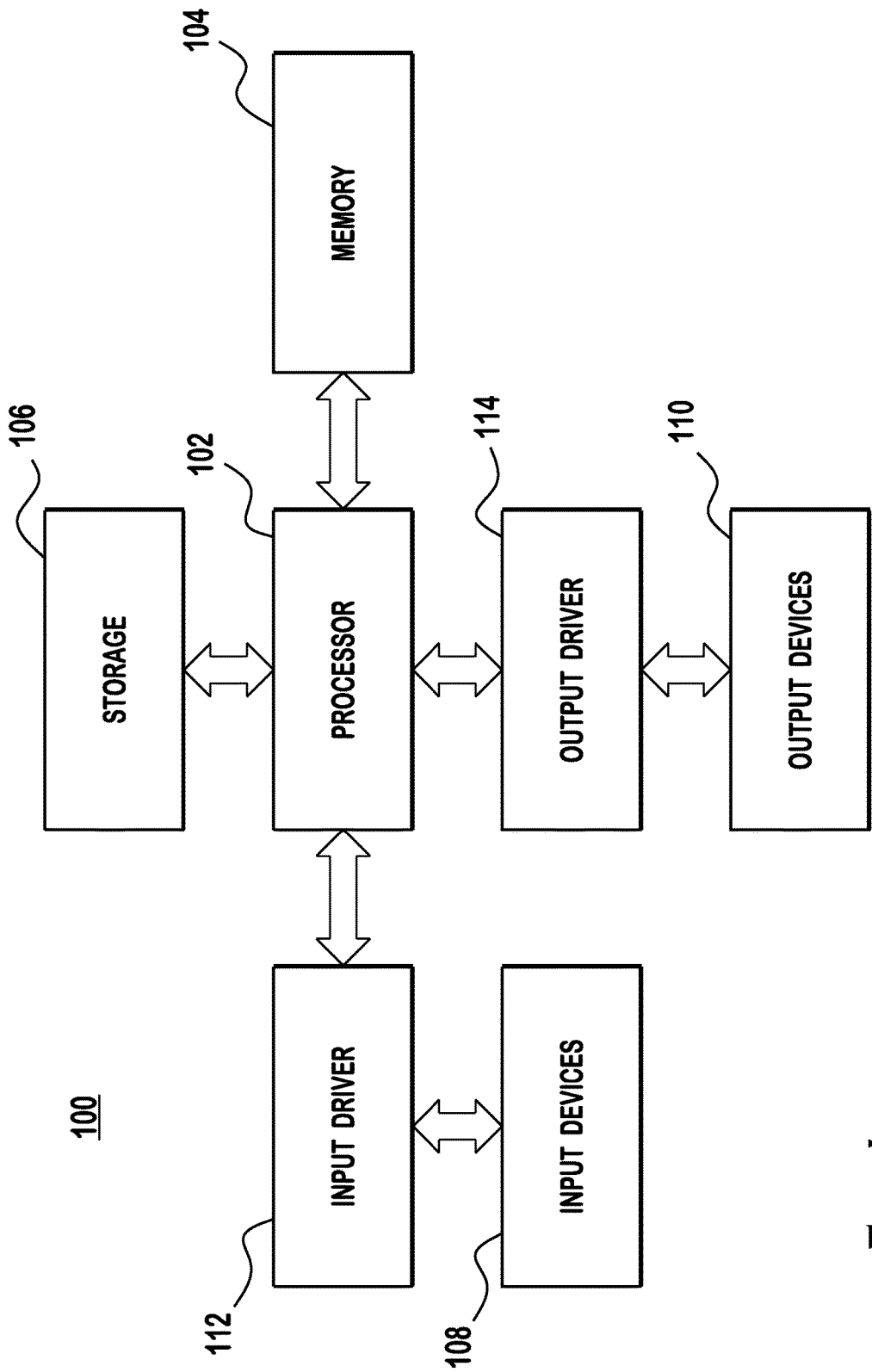
FIG. 1 is a block diagram of an example device in which one or more disclosed embodiments may be implemented.

FIG. 1 is a block diagram of an example device 100 in which one or more disclosed embodiments may be implemented. The device 100 may include, for example, a computer, a gaming device, a handheld device, a set-top box, a television, a mobile phone, or a tablet computer. The device 100 includes a processor 102, a memory 104, storage 106, one or more input devices 108, and one or more output devices 110. The device 100 may also optionally include an input driver 112 and an output driver 114. It is understood that the device 100 may include additional components not shown in FIG. 1.

The processor 102 may include a central processing unit (CPU), a graphics processing unit (GPU), a CPU and GPU located on the same die, or one or more processor cores, wherein each processor core may be a CPU or a GPU. The memory 104 may be located on the same die as the processor 102, or may be located separately from the processor 102. The memory 104 may include a volatile or non-volatile memory, for example, random access memory (RAM), dynamic RAM, or a cache.

The storage 106 may include a fixed or removable storage, for example, a hard disk drive, a solid state drive, an optical disk, or a flash drive. The input devices 108 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 may include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2:
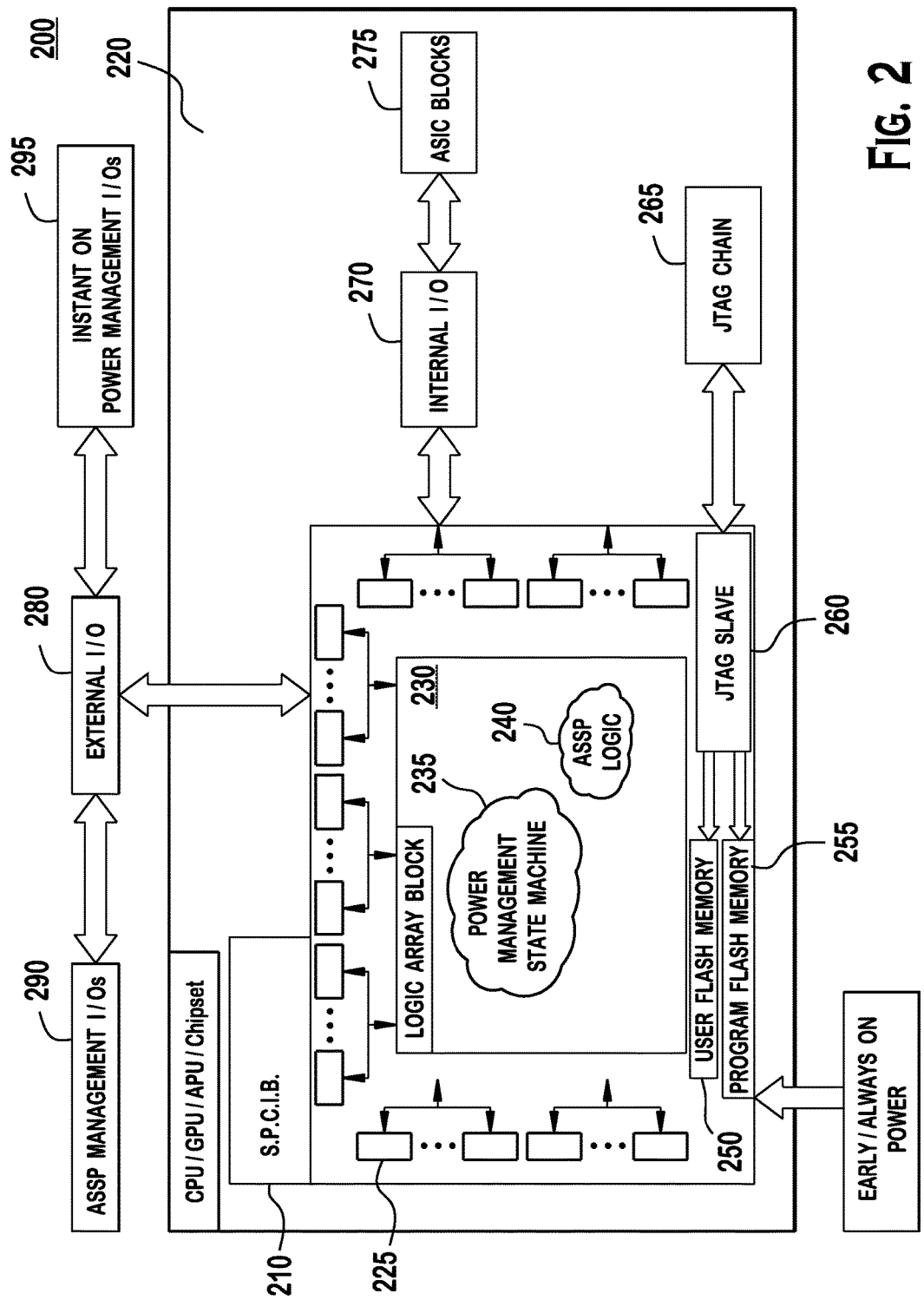
FIG. 2 illustrates a block diagram of an embedded system power controller and ASSP initializing block (SPCIB)

FIG. 2 illustrates a block diagram of an embedded system power controller and ASSP initializing block (SPCIB). Diagram 200 includes a SPCIB 210, a chipset 220, a plurality of input/output blocks (IOB) registers 225, a logic array block 230, a power management state machine 235, ASSP logic 240, a user flash memory 250, a program flash memory 255, a JTAG slave 260, a JTAG chain 265, an internal I/O 270, ASIC blocks 275, an external I/O 280, ASSP management I/Os 290, and instant on power management I/Os 295. The SPCIB 210 may include the plurality of IOB registers 225, the user flash memory 250, the program flash memory 255, the JTAG slave 260, and the logic array block 230, which includes the power management state machine 235 and the ASSP logic 240. The chipset 220 may include SPCIB 210, the JTAG chain 265, the internal I/O 270, and the ASIC blocks 275. External to the chipset 220 containing the SPCIB 210 is the external I/O 280, the ASSP management I/O 290 and the instant on power management I/Os 295.

Power management/ASSP blocks generally have been implemented in segments of non-reconfigurable hardware and software. Chip level and system/product level blocks that cannot share resources or cannot be integrated due to the non-reconfigurable nature of the hardware and the multi-player and highly interdependent structure of the software. Thus, the power management of the main chip acts mostly as a black box that is unable to merge the chip and system requirements and share resources. According to an embodiment, the integrated, field programmable and reconfigurable block 230 and the re-routable external and internal I/O ports 280 and 270 may allow a product-specific central power management block that is capable of managing the power of not only the chipset 220, but also managing the power of other system blocks on the printed circuit board (PCB) to which the various components of device 100 may be mounted, connected and/or executed on. This design may reduce or eliminate the need for embedded microprocessors running power and ASSP firmware and the external power management board blocks. This design may break down the boundaries of chip specific power and ASSP requirements and the system level power and ASSP requirements. This unification may allow easier chip and board power up and may lead to size reductions.

The logic array 230 in the SPCIB 210 may have the versatility to be used to implement both internal and external power management and also ASSP management. The finite state machine (FSM) may have registers controllable by a basic input/output system (BIOS). Templates of each hardware description language (HDL) module and limited programming access may be provided to OEMs, so that product customization may occur based on the OEM product.

The SPCIB 210 may be a multi-purpose field programmable non-volatile system power controller and ASSP initializing block that may be embedded in a processor chipset that is reconfigurable as a specialized hardware block. The SPCIB 210 may be implemented as a mid-size complex programmable logic device (CPLD) or as a few cascaded programmable logic array (PLA) blocks equivalent to a few hundred logic gates, for example.

The chipset 220 may be designed to operate with a specific family of microprocessors. The chipset 220 may be one or more central processing units (CPU), graphics processing units (GPU), and/or accelerated processing units (APU), for example. The chipset 220 may control communications between the processor and external devices, and therefore may play a crucial role in determining system performance. The chipset 220 may be a set of specialized chips on a computer's motherboard or an expansion card. Access to the internal register bank of the chipset 220 may be defined by a register access table (RAT). The RAT may be set dynamically by the manufacturer, for example, the RAT may be dynamically set by a driver and/or hardcoded into the ASIC 275.

The plurality of input/output block (IOB) registers 225 may include one or more registers that provide the transfer of information from inputs to the central computer or from it to output equipment. While the IOBs 225 are oriented in a specific direction in FIG. 2, the IOBs 225 may be used in either direction and may be configured to operate bi-directionally.

The logic array block 230 may include a block of circuitry on the chipset 220, permitting the chipset 220 to be easily customized for a specific application. The power management state machine 235 may be flexible, to access and allow customization. The ASSP logic 240 may include an application specific standard product (ASSP) which is an integrated circuit (IC) dedicated to a specific application similar to an application specific integrated circuit (ASIC) that is provided across multiple platforms and often to more than one company.

The JTAG slave 260 may provide information and commands locally to the SPCIB 210, such as to the user flash memory 250 and the program flash memory 255. The JTAG slave 260 may provide commands and information from the SPCIB 210 to the JTAG 265 that is resident on the chipset 220. The SPCIB 210 may have high level software handles for in-system programming of the flash memories 250, 255. For example, a plug-in may already be running an existing application or a new specific application, for example. The JTAG may be bidirectional.

The user flash memory 250 and the program flash memory 255 each may include non-volatile computer storage that can be electrically erased and reprogrammed including Electrically Erasable Programmable Read-Only Memory (EEPROM) that may be erased in fairly large blocks to be rewritten with new data, high density NAND type that may be programmed and read in smaller blocks or pages, while the NOR type allows a single machine word (byte) to be written or read independently. Each of the flash memories 250, 255 may be bidirectional.

Operationally, the program flash memory 255 of the SPCIB 210 may be the first block to be powered on and/or may always remain on based on system requirements. A low power consumption mode may be used in either the always-on/first powered on states. This first-on/always-on may enable the SPCIB 210 to perform power sequencing and boot strapping for both internal and external blocks via the internal I/O 270 and the external I/O 280.

The SPCIB 210 may be added to the JTAG chain 265, and the JTAG slave 260 may be used for uploading the programmable object file to the program flash memory 255. The JTAG chain 265 may provide access to JTAG slave 260. For example, JTAG 260, 265 may be used to program user flash memory 250. JTAG slave 260 is the common name for what was later standardized as the IEEE 1149.1 Standard Test Access Port and Boundary-Scan Architecture that is used for IC debug ports. In the embedded processor market, essentially all modern processors support JTAG when they have enough pins. Embedded systems development relies on debuggers talking to chips with JTAG to perform operations like single-stepping and breakpointing.

An input/output (I/O) interface may include both internal I/Os 270 that are manufacturer specific, for example, coupled to an internal application specific integrated circuit (ASIC) blocks 275, such as a processor including a CPU, APU, and/or GPU, for example, and external I/Os 280 used for ASSP management I/Os 290 and instant on power management I/Os 295. Each of the I/Os may be tri-stated during flash load time. Selected I/Os may be configurable multi-voltage and optional signal delays.

The internal I/O 270 may receive commands and information from the SPCIB 210. The internal I/O 270 may provide information and commands internal to the chipset 220, such as to the ASIC blocks 275. The internal I/O 270 includes input/output (I/O) and refers to the communication between the logic array block 230 and the chipset 220 or any other external devices. Inputs are the signals or data received by the system, and outputs are the signals or data sent.

The internal I/O 270 may permit access to the registers 225 indirectly using inter-integrated circuit (I2C) This access may be a software stack backdoor. As is known by those possessing an ordinary skill in the pertinent arts, registers often have the access wrapped through software, such as using an API that navigates through the layers. According to the present invention, access to the registers 225 may be through the internal I/O 270, avoiding the software layers. This provides a complimentary access to the registers and allows the circumvention of the timing associated with the registers 225 for fast access. This back door access may include a smaller bus specialized for system customization, for example.

The ASIC blocks 275 may include application-specific integrated circuits (ASICs) customized for a particular use, rather than intended for general-purpose use. For example, a chip designed to run in a digital voice recorder is an ASIC. Designers of digital ASICs use a hardware description language (HDL), such as Verilog or VHDL, to describe the functionality of ASICs. Field-programmable gate arrays (FPGA) may include programmable logic blocks and programmable interconnects that allow the same FPGA to be used in many different applications.

The external I/O 280 may receive commands and information from the chipset 220 and the SPCIB 210. The external I/O 280 may provide information and commands to other I/O devices, such as the ASSP management I/Os 290 and the instant on power management I/Os 295. The external I/O 280 may be bi-directional to allow bidirectional sharing of I/O and logic resources. Some I/Os may have special features such as Schmitt trigger, 5 volt tolerance, and tri-state capability, for example.

The ASSP management I/Os 290 may provide I/O to an application specific standard product or ASSP in an integrated circuit that implements a specific function that appeals to a wide market. As opposed to ASICs that combine a collection of functions and one designed by or for one customer, ASSPs are available as off-the-shelf components. ASSPs are used in all industries, from automotive to communications. Examples of ASSPs are integrated circuits that perform video and/or audio encoding and/or decoding.

OEM system architects may be able to use the field programmable block to perform system/board level and power and ASSP management providing chips that contain such a block a competitive edge and enhanced value. For example, power sequencing of the chipset 220, which may require 3.3 volts to power up and take at least 20 microseconds, may be powered up using the external I/O 280 and the power manager state machine 235.

The flexible design may simplify debugging by loading different debug circuits intended to test various blocks of the ASIC which may be particularly useful for high-end chips. Blocks designed to verify functionality of blocks one-by-one or as groups implemented in SPCIB 210 may assist in loading the ASIC blocks 275. For example, a frame generator block may be used to test the transmitter block, a memory pattern generator block may be used to test the functionality of DMA block, and the internal I/O 270 may be used as a route debug signal to different blocks from signal generator through the external I/O 280.

At least a portion of the power management FSMs implemented by low-level firmware may be transferred to the block, simplifying and optimizing the low-level PM code. Additionally, the number of silicon revisions may be reduced taking advantage of the partial field programmability specifically for large high-end ASICs by finding hardware/software combination work-arounds.

More compact design replaces power sequencing, glue logic blocks and I/O expansion blocks. Power consumption may be reduced especially in hand-held products.

Figure 3:
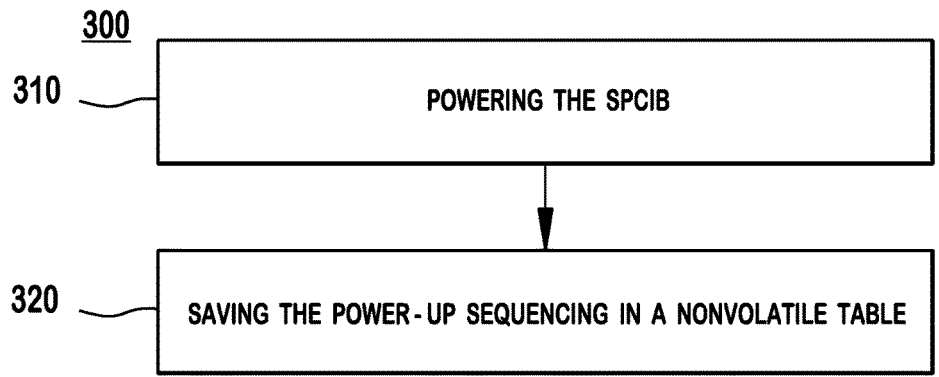
FIG. 3 illustrates a method of performing power sequencing and boot strapping for internal and external blocks.

FIG. 3 illustrates a method 300 of performing power sequencing and boot strapping for internal and external blocks. The method 300 includes powering the SPCIB (step 310) and saving the power sequencing step 320. Powering the SPCIB (step 310) may occur as the first ASIC block to be awakened and/or may occur because the system 200 permitted the SPCIB 210 to remain awake. The wake-up of the SPCIB 210 may be incremental and may be reconfigured based on system requirements. In saving the power-up sequencing in a nonvolatile table at step 320, a portion of the SPCIB 210 may be required to be awake and perform power sequencing and/or boot strapping in a short (e.g., 10 microsecond) time frame. The remainder of the block may be required to be functional in 1 millisecond. In such a scenario, the nonvolatile wake-up table may be programmed to wake-up the critical, faster response, block first. After this critical block is awake, the table may enable opening of the power switch to the remainder of the blocks.

Figure 4:
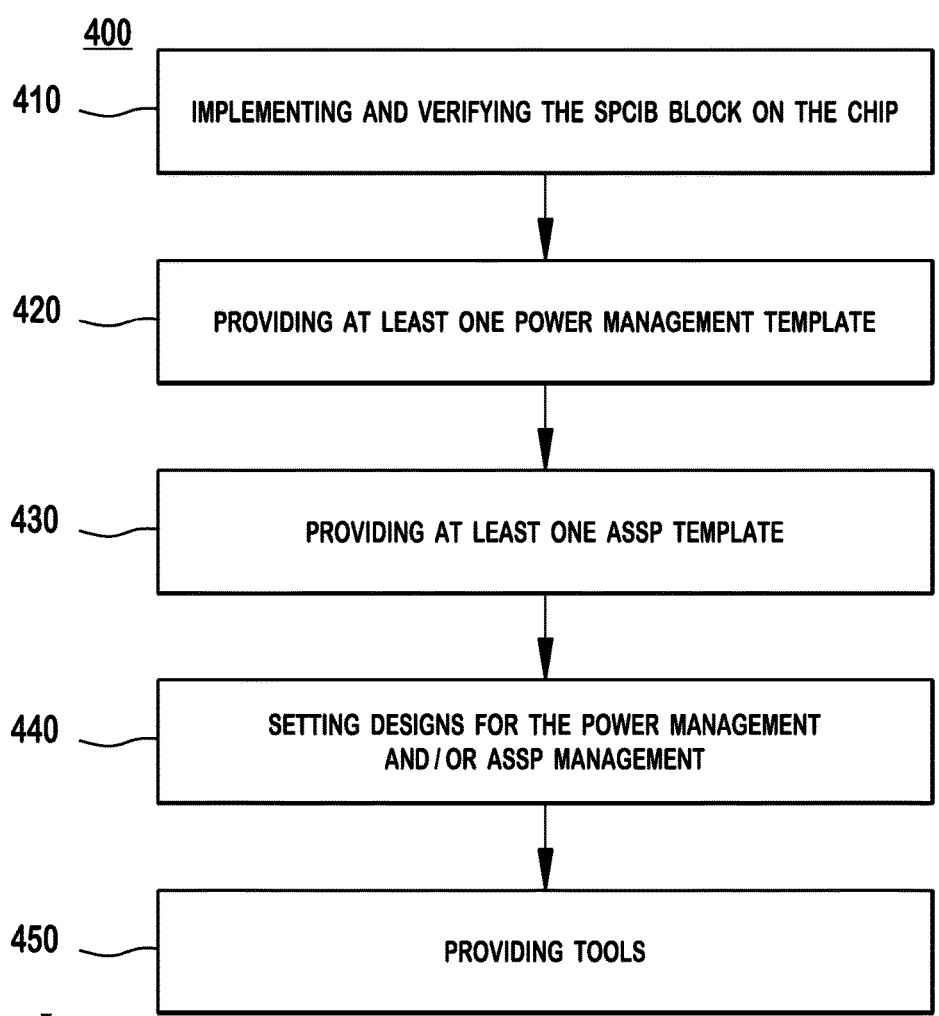
FIG. 4 illustrates a method for implementing internal and external power management and ASSP management.

FIG. 4 illustrates a method 400 for implementing internal and external power management and ASSP management. The method 400 includes implementing and verifying the SPCIB block 210 on the chipset 220, at step 410. The size, complexity, and links between the SPCIB 210 and the remainder of the module device may vary from chipset 220 to chipset 220 based on the specific requirements of the specific chipset 220. At step 420, method 400 includes providing at least one power management template that may include one or both of external power management templates and internal power management templates. External power management templates may focus on external power management. Internal power management templates focus on the internal power management block. Internal and external templates may be mixed to balance the SPCIB 210 resources between internal and external power management and may link and unify the power control system. Such management may be on the logic array 230. Providing at least one ASSP template (step 430) may include system vendor and/or target device class categorized templates. The CAD tools to develop and debug the HDL and for the block are provided at step 440. Setting designs for the power management/ASSP may be included in step 450. CAD tools may include libraries emulating the chipset 220 for developing and/or debugging the SPCIB 210. Such a template may be provided to product manufacturers. The template may include internal focus and external focus utilization of the SPCIB 210.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the present invention.

The methods or flow charts provided herein may be implemented in a computer program, software, or firmware incorporated in a non-transitory computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method of performing power sequencing and boot strapping for internal and external blocks on a chipset, the method comprising:
    performing, by a system power controller and initializing block (SPCIB), power sequencing and boot strapping for the internal and external blocks of the chipset to generate a power-up template, wherein the internal and external blocks of the chipset include an application specific standard product (ASSP) block and a remainder of blocks that are required to be awake in a time frame after the ASSP block;
    storing, by the SPCIB, the power-up template in a non-volatile wake-up table;
    waking-up, by the SPCIB, the ASSP block according to the power-up template stored in the non-volatile wake-up table, wherein the ASSP block is required to be awake within a predetermined time frame; and
    providing, by the ASSP block, power to the remainder of blocks after the ASSP block is awoken according to the power-up template.

2. The method of claim 1, wherein a power switch is opened by the ASSP to provide the power to the remainder of the blocks.

3. The method of claim 2, wherein the ASSP block is a program flash memory.

4. The method of claim 1, wherein the SPCIB is incrementally awakened.

5. The method of claim 1, wherein the non-volatile wake-up table enables opening of a power switch by the ASSP.

6. The method of claim 5, wherein the ASSP block is a program flash memory.

7. The method of claim 5, wherein the remainder of the blocks awaken in a time greater than the predetermined time frame.

8. A chipset including internal and external blocks, comprising:
    a system power controller and initializing block (SPCIB) configured to generate a power-up template by performing power sequencing and boot strapping for the internal and external blocks of the chipset, wherein the internal and external blocks of the chipset include an application specific standard product (ASSP) block and a remainder of blocks that are required to be awake in a time frame after the ASSP block; and
    a non-volatile wake-up table configured to store the power-up template;
    wherein the SPCIB is further configured to:
    wake up the ASSP block according to power-up template stored in the non-volatile wake-up table, wherein the ASSP block is required to be awake within a predetermined time frame,
    wherein the ASSP block, in response to being awoken by the SPCIB, is configured to provide power to the remainder of the blocks according the power-up template.

9. The chipset of claim 8, further comprising:
    a power switch, wherein the power switch is opened by the ASSP to provide the power to the remainder of the blocks.

10. The chipset of claim 9, wherein the ASSP block is a program flash memory.

11. The chipset of claim 8, wherein the SPCIB is incrementally awakened.

12. A computer readable non-transitory medium including instructions which when executed in a processing apparatus cause the processing apparatus to execute a method for performing a power sequencing and boot strapping for internal and external blocks on the processing apparatus, the method comprising:
    performing, by a system power controller and initializing block (SPCIB), power sequencing and boot strapping for the internal and external blocks of a chipset to generate a power-up template, wherein the internal and external blocks of the chipset include an application specific standard product (ASSP) block and a remainder of blocks that are required to be awake in a time frame after the ASSP block;
    storing, by the SPCIB, the power-up template in a non-volatile wake-up table;
    waking-up, by the SPCIB, the ASSP block of the chipset before a remainder of the blocks by the SPCIB using the power-up template stored in the non-volatile wake-up table, wherein the ASSP block is required to be awake within a predetermined time frame; and
    providing, by the ASSP block, power to the remainder of blocks after the ASSP block is awoken according to the power-up template.

13. The computer readable non-transitory medium of claim 12, wherein a power switch is opened by the ASSP to provide the power to the remainder of the blocks.

* * * * *